United States Patent [19]
Kuga et al.

[11] Patent Number: 5,604,529
[45] Date of Patent: Feb. 18, 1997

[54] THREE-DIMENSIONAL VISION CAMERA

[75] Inventors: Kaeko Kuga; Takuzo Uemura, both of Kyoto, Japan

[73] Assignee: Rohm Co., Ltd., Kyoto, Japan

[21] Appl. No.: 382,394

[22] Filed: Feb. 1, 1995

[30] Foreign Application Priority Data

Feb. 2, 1994 [JP] Japan .................................. 6-010749

[51] Int. Cl.$^6$ .......................... H04N 13/02; H04N 15/00
[52] U.S. Cl. ............................. 348/46; 395/24; 395/21; 395/2.11; 396/48; 396/252
[58] Field of Search ................................ 348/44, 46, 50, 348/42; 395/21, 24, 2.11; 354/412, 460

[56] References Cited

U.S. PATENT DOCUMENTS

| | | | |
|---|---|---|---|
| 4,965,443 | 10/1990 | Yamasaki et al. | 250/201.7 |
| 4,978,990 | 12/1990 | Yamasaki et al. | 354/432 |
| 5,276,771 | 1/1994 | Manukian et al. | 395/24 |
| 5,424,773 | 6/1995 | Saito | 348/218 |
| 5,500,671 | 3/1996 | Andersson et al. | 348/15 |

*Primary Examiner*—Thai Q. Tran
*Assistant Examiner*—Aung S. Moe
*Attorney, Agent, or Firm*—Nikaido, Marmelstein, Murray & Oram LLP

[57] ABSTRACT

To provide a three-dimensional vision camera where no disagreement is caused between two-dimensional image information and distance information, the three-dimensional vision camera is provided with a memory (11), a neural network (12) and a three-dimensional image synthesizer (13). In the memory (11), image data of a photographic object shot from different directions are stored. Information necessary for converting the image sensed by an image sensing device (2) into a three-dimensional image is read out from the image data of the memory (11) by the neural network (12). A three-dimensional image is produced by the three-dimensional image synthesizer (13).

2 Claims, 5 Drawing Sheets

THREE-DIMENSIONAL VISION CAMERA

BACKGROUND OF THE INVENTION

1. Field of the Invention

The present invention relates to a three-dimensional vision camera for photographing a three-dimensional image.

2. Description of the Prior Art

As a method to observe a three-dimensional image, three-dimensional vision is known: a two-dimensional image is shot by a camera and information on the distance to the photographic object is obtained to produce a three-dimensional vision signal. The three-dimensional image is reproduced on a three-dimensional vision screen.

Referring to FIG. 1, there is shown the arrangement of a conventional three-dimensional vision camera for producing a three-dimensional vision signal. This three-dimensional vision camera is provided with an image sensor 51, a distance measurer 52 and a synthesizer 53. The image sensor 51 including a taking lens 54 and a charge coupled device (CCD) 55 serving as a light receiving element directs a light beam from a photographic object 50 to the CCD 55 to perform photographing. The CCD 55 converts the received light beam into an electric signal and outputs it as a video signal.

The distance measurer 52 including a light emitting diode (LED) 56 serving as a light emitting device and a photodiode array 57 serving as a light receiving device irradiates a light beam from the LED 56 to the photographic object 50. The reflected light beam is received by the photodiode array 57. In front of the LED 56, a lens 58 is provided for directing the irradiated light beam to the photographic object 50. In front of the photodiode array 57, a lens 59 is provided for directing the reflected light beam to the photodiode array 57. The photodiode array 57 converts the received light beam into an electric signal and outputs it as a distance signal. The distance to the photographic object 50 is detected based on the light received position on the photodiode array 57.

The synthesizer 53 produces a three-dimensional vision signal from the video signal from the CCD 55 and the distance signal from the photodiode array 57 and outputs the three-dimensional vision signal. The three-dimensional vision signal thus produced is transmitted to a three-dimensional vision screen (not shown) to display a three-dimensional image.

In the three-dimensional vision camera of the above-described arrangement, the image sensor 51 and the distance measurer 52 are separately provided and the photographing and the distance measurement are performed by the two individual optical systems. Thus, the image, i.e. two-dimensional information (x and y vectors) and the distance information (z vector) are obtained by the different optical systems, so that a disagreement is caused between the x and y vectors and the z vector. When the distance between the image sensing optical system and the distance measuring optical system is large, the disagreement between the vectors increases, so that the three-dimensional image displayed on the three-dimensional vision screen is unnatural. The reduction in distance between the image sensing and distance measuring optical systems is limited in the arrangement where the image sensor and the distance measurer are separately provided, so that it is impossible to produce a three-dimensional vision signal in which the vectors completely agree with each other.

SUMMARY OF THE INVENTION

An object of the present invention is to provide a three-dimensional vision camera in which image sensing is performed by one optical system and no disagreement is caused between two-dimensional image information and distance information.

To achieve the above-mentioned object, a three-dimensional vision camera of the present invention is provided with the following: an image sensing device; an optical system for directing a light beam from a photographic object to the light sensing device; a memory in which a plurality of image data are stored; a neural network which obtains three-dimensional image information of the photographic object based on an image sensed by the image sensing device and the image data stored in the memory; and an image synthesizer which synthesizes the image sensed by the image sensing device and the three-dimensional image information obtained by the neural network into a three-dimensional image.

In the memory, image data of a photographic object shot from different directions are stored. Supplied with a two-dimensional image sensed by the image sensing device, the neural network obtains information necessary for converting the two-dimensional image into a three-dimensional image from the image data stored in the memory. The image synthesizer synthesizes the sensed image and the information into a three-dimensional image.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
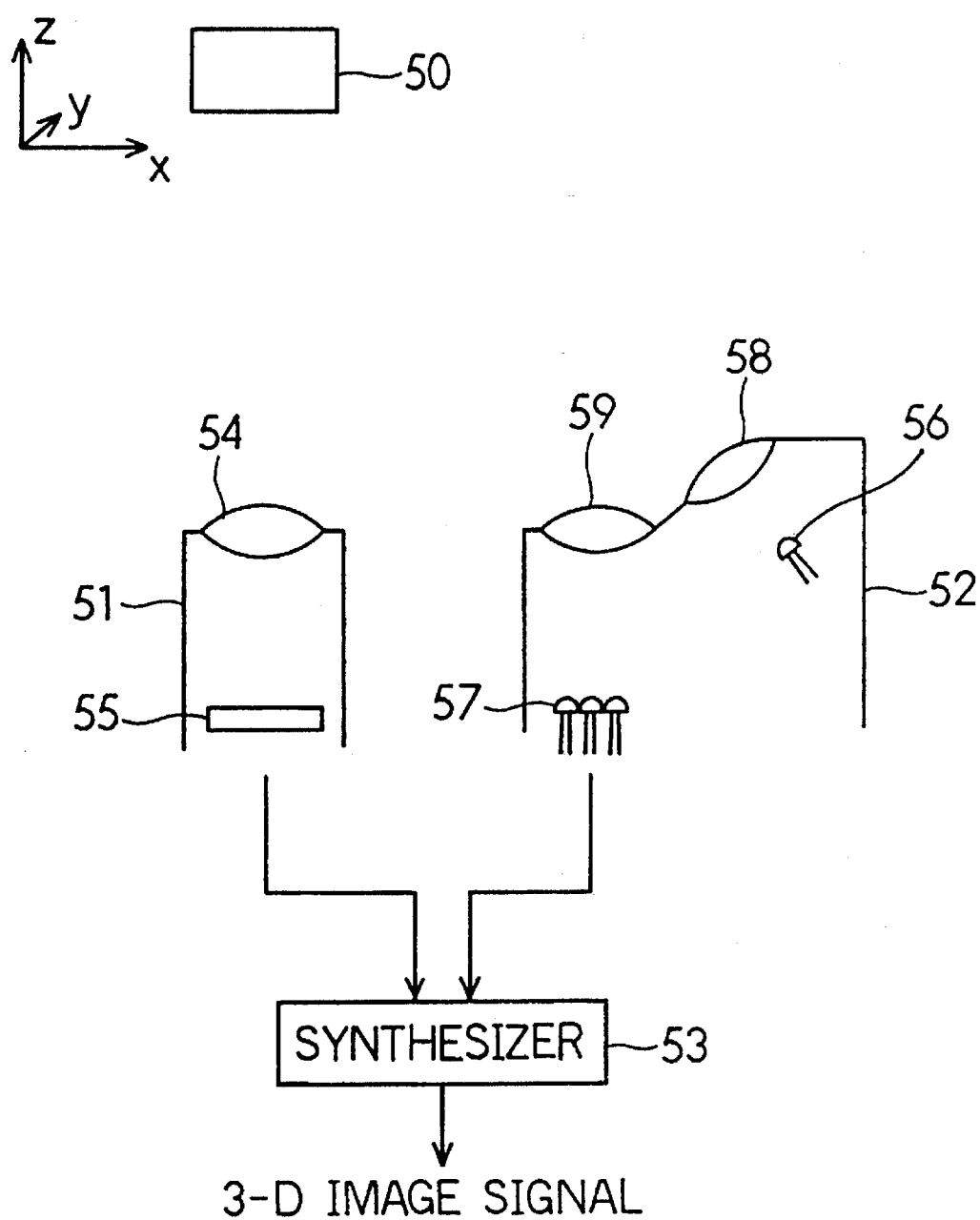
FIG. 1 shows the arrangement of a conventional three-dimensional vision camera.
Figure 2:
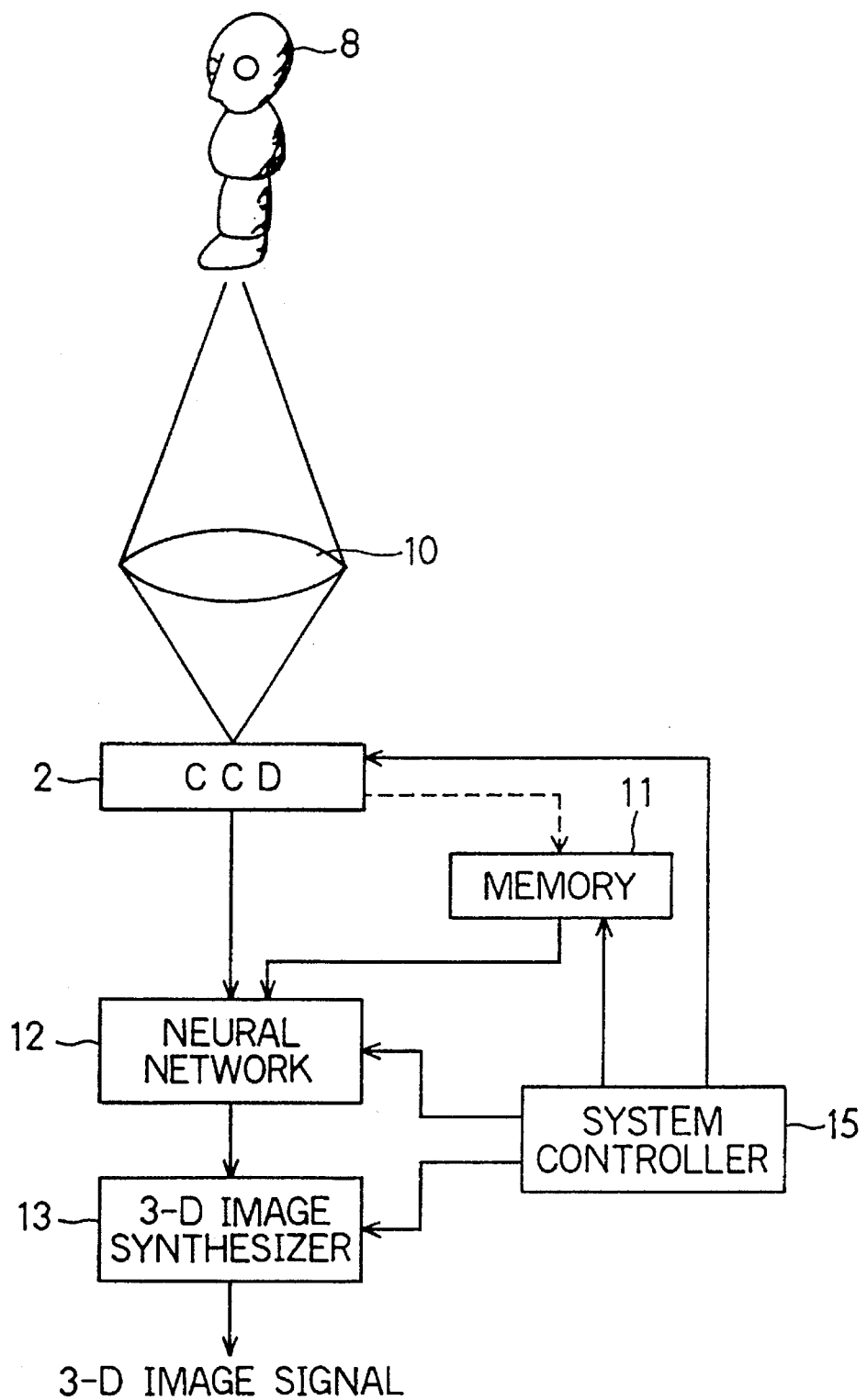
FIG. 2 shows the arrangement of a three-dimensional vision camera of the present invention.

Referring to FIG. 2, there is shown the arrangement of a three-dimensional vision camera of the present invention. This three-dimensional vision camera is provided with a CCD 2 serving as an image sensing device, an image sensing lens 10, a memory 11 for storing image data therein, a neural network 12 having a learning function and a three-dimensional image synthesizer 13.

The memory 11 comprising a non-volatile and rewritable ferroelectric random access memory (FRAM) or electrically erasable programmable read only memory (EEPROM) stores therein image data of a photographic object 8 shot from various directions. A light beam from the photographic object 8 is formed into an image on the CCD 2 by the image sensing lens 10 to sense a two-dimensional image, and an image data close to the sensed image is selected from the memory 11 by the neural network 12. The neural network 12 obtains information necessary for converting the sensed two-dimensional image into a three-dimensional image based on the image data read out from the memory 11 and supplies the information to the three-dimensional image synthesizer 13. The three-dimensional image synthesizer 13 produces a three-dimensional image from the information and the sensed image.

The operations of the above-described elements and the data transfer among the elements are controlled by a system controller 15. The image sensed by the CCD 2 is stored in the memory 11 to be used to produce a three-dimensional image in the next photographing.

The hierarchical neural network used in the present invention will be described. A neural network is an information processing system designed after the human neural network. In the neural network, the engineering model of the neuron corresponding to the nerve cell is called a unit.

Figure 3:
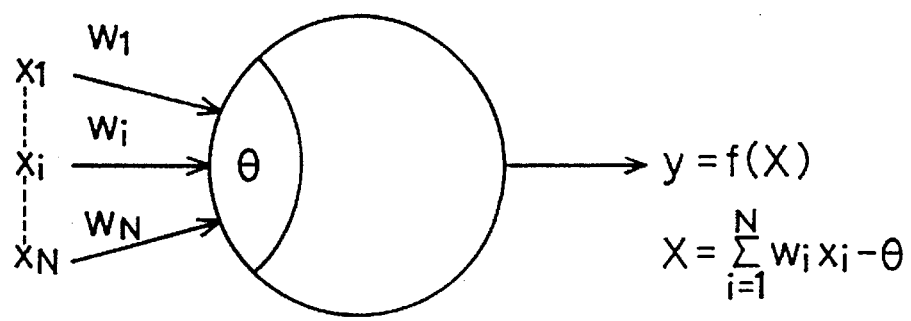
FIG. 3 schematically shows an engineering model of neurons constituting a neural network.
Figure 4:
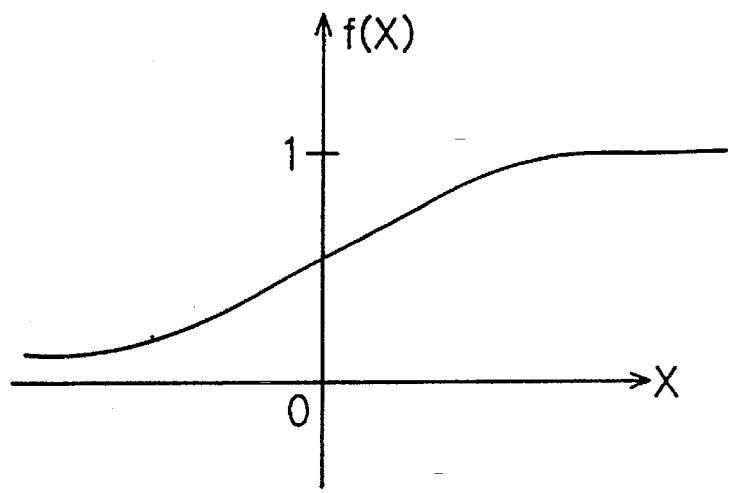
FIG. 4 shows an input/output characteristic of the neurons of a neural network used in the present invention.

As the unit, a multi-input, one-output device as shown in FIG. 3 is used. Signals are transmitted only in one direction and inputted to the unit after provided with a certain weight (coupling load $w_i$). This weight represents the strength of the coupling of the units. The strength of the coupling of the units can be varied by learning. A value X obtained by subtracting a threshold value $\theta$ from the sum total of the weighed input values ($w_i \cdot x_i$) is outputted after transformed by a response function f. The output value y of the unit is defined by the expression (1):

$$y = f(X) \quad (1)$$

where $X = \Sigma w_i \cdot x_i - \theta$. The value X inputted to the unit is transformed according to the response function f of the unit. As the response function f, a sigmoid function shown in FIG. 4 is used.

Figure 5:
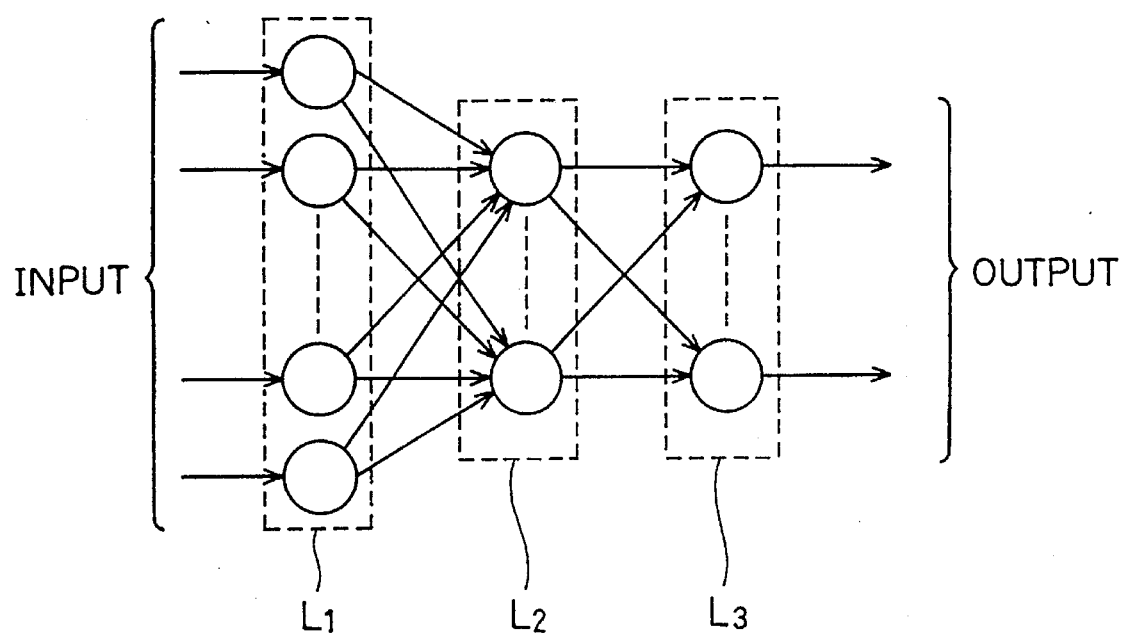
FIG. 5 shows the hierarchical structure of the neural network used in the present invention.

Referring to FIG. 5, there is shown a hierarchical neural network used in the present invention. The units represented by circles in the figure are hierarchized into an input layer L1, an intermediate layer L2 (including one or a plurality of layers) and an output layer L3. The units are connected so that units in different layers are connected; units in the same layer are not connected. Signals are transmitted only in one direction, i.e. from the input to the output. Normally, the units in the input layer L1 has no sigmoid function and no threshold value, and the input value appear at the output as it is. The output value U of the neural network is defined by the expression (2):

$$U = f(\Sigma V_j \cdot H_j - \gamma) \quad (2)$$

where $H_j = f(\Sigma W_{ij} \cdot X_i - \theta_j)$, $X_i (i=1 \text{ to } M)$ is the input of a unit i in the input layer L1, $H_j (j=1 \text{ to } N)$ is the output of a unit j in the intermediate layer L2, U is the output of a unit in the output layer L3, $W_{ij}$ is the coupling load from the unit i in the input layer L1 to the unit j in the intermediate layer L2, $V_j$ is the coupling load from the unit j in the intermediate layer L2 to the unit in the output layer L3, $\theta_j$ is the threshold value of the unit j in the intermediate layer L2, $\gamma$ is the threshold value of the output layer L3, M is the number of units in the input layer L1, and N is the number of units in the intermediate layer L2.

As the learning algorithm for the hierarchical neural network, back propagation is used such that the coupling loads between the intermediate layer L2 and the output layer L3 and between the input layer L1 and the intermediate layer L2 and the threshold values are successively varied by using the steepest descent method so that the square errors of the learning signal and the output signal are minimum. By the learning algorithm called back propagation, a neural network capable of realizing a high recognition rate is easily formed.

Subsequently, the operation will be described. First, the photographic object 8 is sensed by the CCD 2. From the CCD 2, a two-dimensional image signal is outputted. This signal is inputted to the neural network 12. To the neural network 12, in addition to the two-dimensional image signal, image data of the photographic object 8 shot at different angles are inputted from the memory 11. The neural network 12 stores some input patterns as stable states of the system of the network, and when an unknown input pattern is supplied, the neural network 12 operates to settle in a stored stable state corresponding to a pattern close to the input pattern.

Specifically, the neural network 12 having the learning algorithm analogizes from past learning information necessary for producing a three-dimensional image from the two-dimensional image data and outputs an image data including the information to the three-dimensional image synthesizer 13. The three-dimensional image synthesizer 13 produces a three-dimensional image from the inputted image data to output a three-dimensional image signal.

Figure 6:
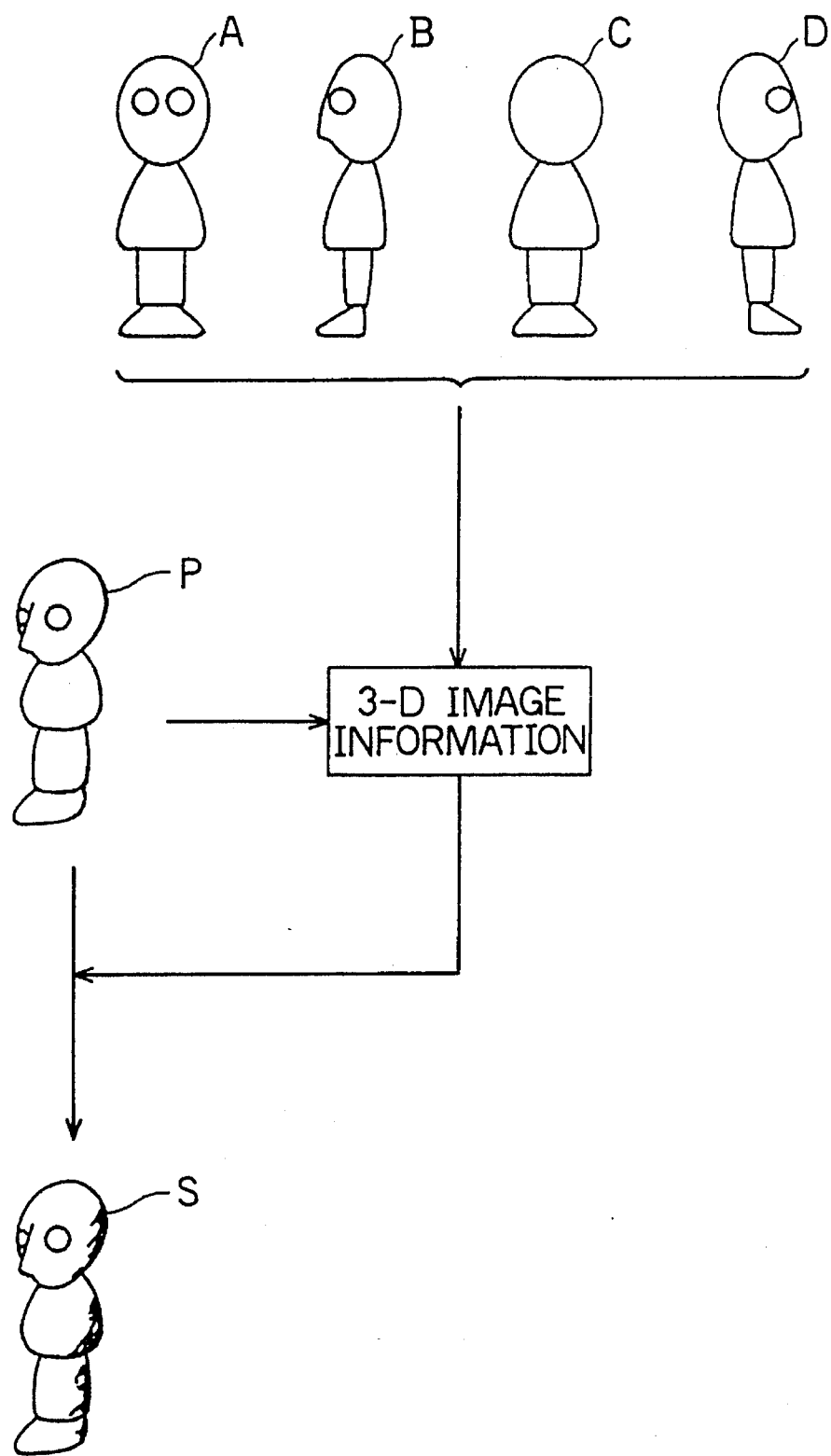
FIG. 6 shows a manner of producing a three-dimensional image from a two-dimensional image.

Referring to FIG. 6, there is shown a manner of producing a three-dimensional image. In the memory 11, two-dimensional images A, B, C and D of the photographic object 8 shot from the front, left, back and right sides are stored in advance. When the image sensing of the photographic object 8 is performed by the CCD 2 and the sensed image P is inputted, the neural network 12 reads out the images A, B, C and D, and compares their image data to obtain a relative three-dimensional position relationship among the parts (e.g. the eyes, the nose, etc.) of the photographic object 8 and detects the positions of the parts on the image P sensed by the CCD 2. The sensing direction of the image P sensed by the CCD 2 is obtained from the positions of the parts of the photographic object 8 on the sensed image P and the obtained three-dimensional position relationship, so that the three-dimensional positions of the parts of the photographic object 8 in the sensing direction are determined. Of the information thus obtained, the image P sensed by the CCD 2 and the image data A, B, C and D read out from the memory 11, the neural network 12 outputs one that is analogous to the sensed image P to the three-dimensional image synthesizer 13. The three-dimensional image synthesizer 13 produces a three-dimensional image S.

Thus, in the three-dimensional vision camera of the present invention, image sensing is performed by one optical system and the sensed image and the three-dimensional image information obtained by the neural network are synthesized into a three-dimensional image, so that no disagreement is caused between two-dimensional image information and distance information. Since it is unnecessary to provide the optical system for distance measurement, the reduction in size of the three-dimensional vision camera is realized.

Obviously, many modifications and variations of the present invention are possible in light of the above teachings. It is therefore to be understood that within the scope of the appended claims, the invention may be practiced other than as specifically described.

What is claimed is:

1. A three-dimensional vision camera comprising:

an image sensing device;

an optical system for directing a light beam from a photographic object to the light sensing device;

a memory in which a plurality of image data are stored;

a neural network which obtains three-dimensional image information of the photographic object based on an image sensed by the image sensing device and the image data stored in the memory; and an image synthesizer which synthesizes the image sensed by the image sensing device and the three-dimensional image information obtained by the neural network into a three-dimensional image.

2. A three-dimensional vision camera according to claim 1, wherein said plurality of image data stored in the memory are image data of the photographic object shot at different angles.

* * * * *